Sept. 17, 1968  K. M. ALLEN ET AL  3,401,728
POTATO SLICER
Filed Oct. 15, 1965  3 Sheets-Sheet 1
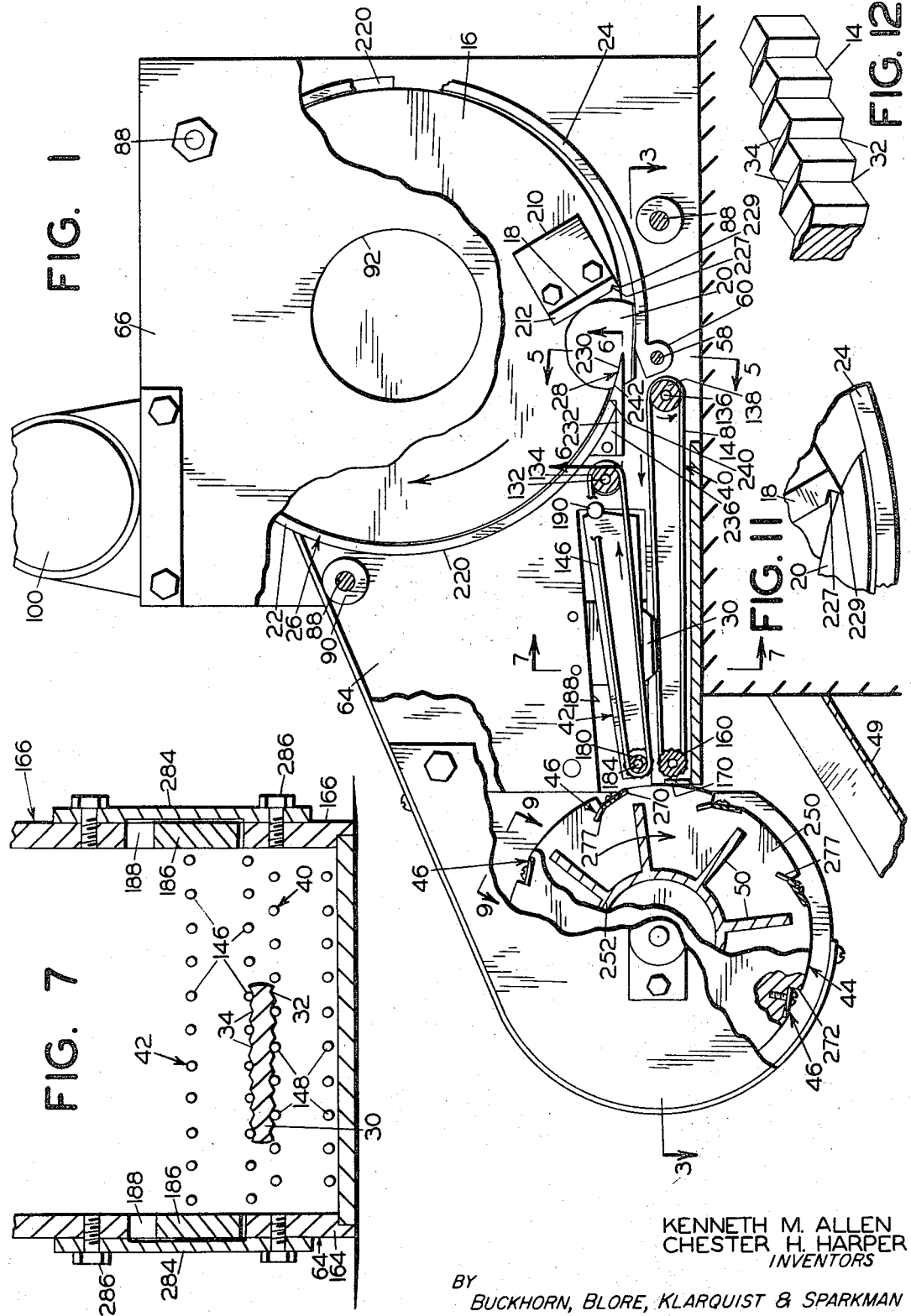
KENNETH M. ALLEN
CHESTER H. HARPER
INVENTORS
BY
BUCKHORN, BLORE, KLARQUIST & SPARKMAN
ATTORNEYS Sept. 17, 1968     K. M. ALLEN ET AL     3,401,728
POTATO SLICER
Filed Oct. 15, 1965     3 Sheets-Sheet 2
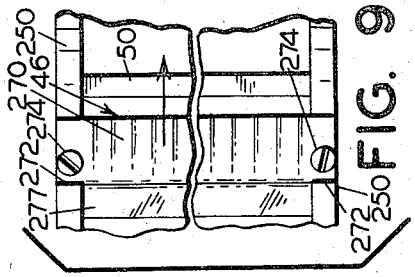
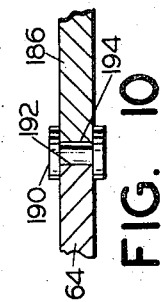
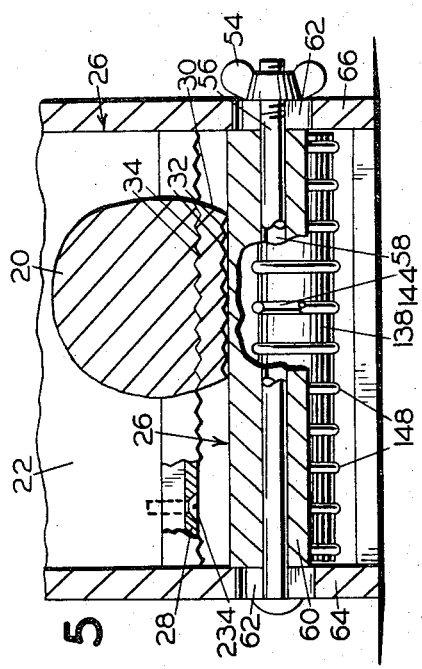
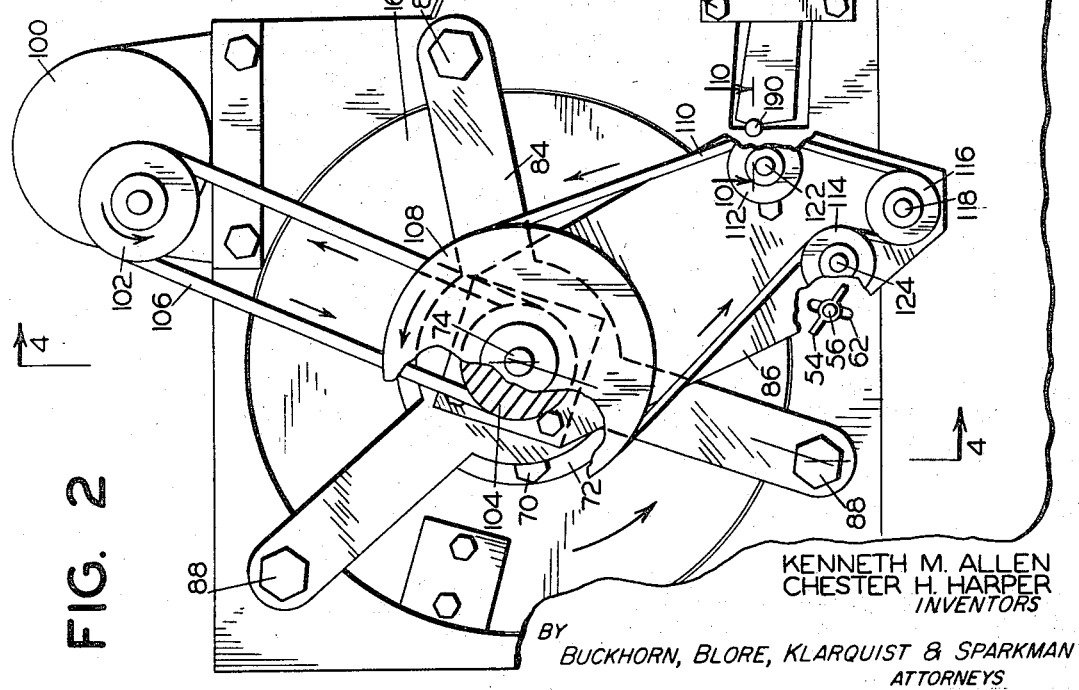
KENNETH M. ALLEN
CHESTER H. HARPER
INVENTORS
BY BUCKHORN, BLORE, KLARQUIST & SPARKMAN
ATTORNEYS Sept. 17, 1968　　　K. M. ALLEN ET AL　　　3,401,728
POTATO SLICER
Filed Oct. 15, 1965　　　　　　　　　　　　　　　3 Sheets-Sheet 3
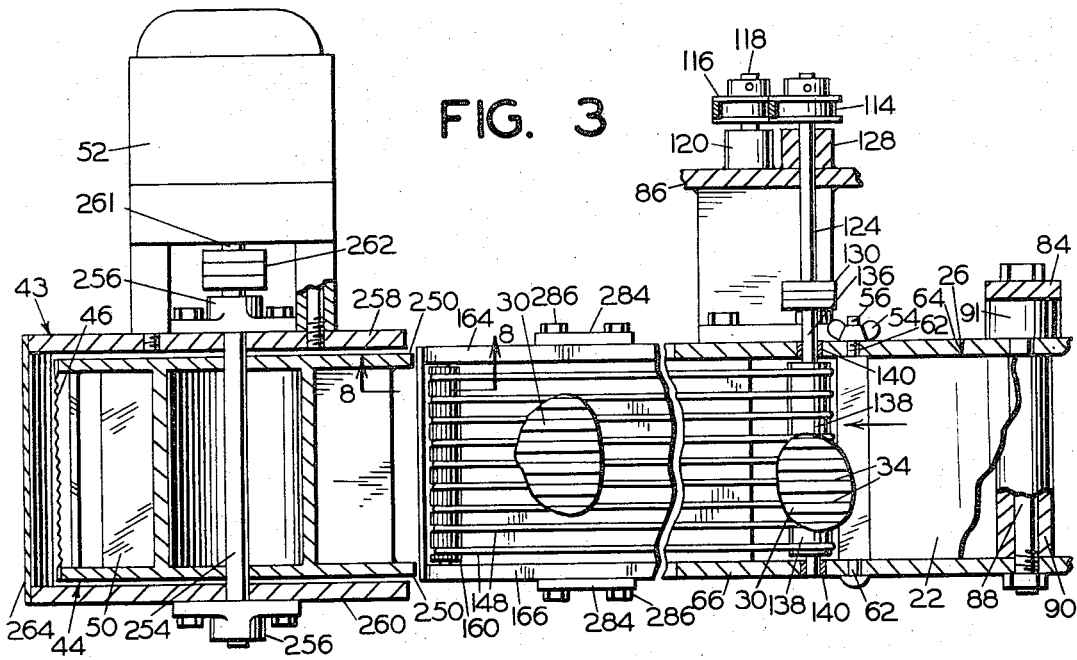
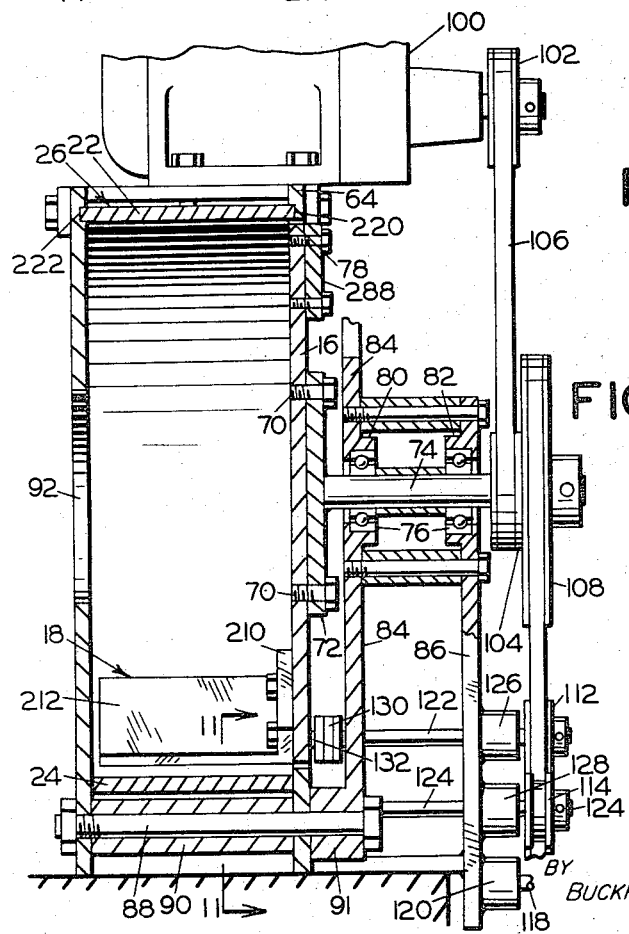
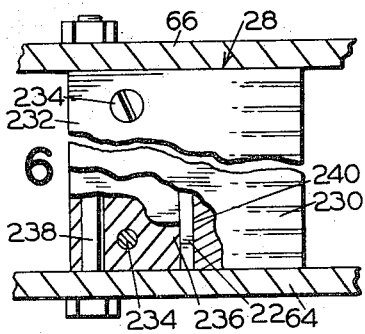
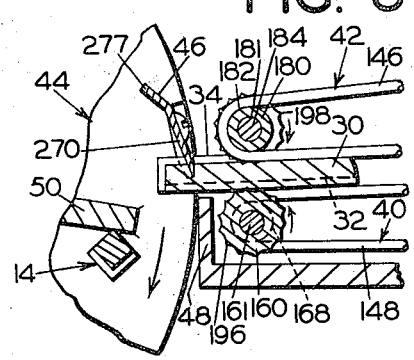
KENNETH M. ALLEN
CHESTER H. HARPER
INVENTORS
BY BUCKHORN, BLORE, KLARQUIST & SPARKMAN
ATTORNEYS United States Patent Office 3,401,728
Patented Sept. 17, 1968

3,401,728
POTATO SLICER
Kenneth M. Allen and Chester H. Harper, Newberg,
Oreg., assignors to Allen-Harper, Inc., Newberg, Oreg.,
a corporation of Oregon
Filed Oct. 15, 1965, Ser. No. 496,561
3 Claims. (Cl. 146—78)

ABSTRACT OF THE DISCLOSURE

A potato slicer includes a slicer having a drum 16 provided with a pusher 18 having a sharp edge 229 which pushes a potato past a corrugated blade 28, a flexible guide plate 24 being adjustable to adjust the thickness of the slices. The corrugated slice is conveyed by endless strands or belts 146 and 148, which enter grooves in the corrugated slice to keep the slice oriented. The strands 146 are presser strands and are carried by a roller 134 and a roller 180, which is carried by arms 186 pivoted on member 190 and the elastic strands 146 pull the arms off-center to press the strands 146 toward the slice 30 and press the slice against the strands 148. The strands 146 and 148 push the slice into a chopper 43 having corrugated knives 46 which extend across the slice and chop the slice into shoestrings. Blades 50 push the shoestrings out of the rotor onto a chute 49. The relative speed of the belts and the rotor can be varied by a rheostat controlled motor 52.

---

This invention relates to a potato slicer, and more particularly to a slicer for forming French fried and shoestring potatoes.

Prior art machines for cutting potatoes into pieces for French fried and shoestring potatoes have been complex and expensive in construction and operation. Such prior art machines have been difficult to maintain and clean. Also, the prior art machines have not been readily adjustable to cut pieces of different sizes.

An object of the invention is to provide a new and improved potato slicer.

Another object of the invention is to provide a new and improved slicer for forming French fried and shoestring potatoes.

A further object of the invention is to provide a simple, inexpensive potato slicer.

Yet another object of the invention is to provide a potato slicer which is easily adjusted to cut pieces of different sizes.

A still further object of the invention is to provide a potato slicer which can be easily cleaned.

Still another object of the invention is to provide a potato slicer which can be easily maintained.

The invention provides a potato slicer having pusher means for pushing a potato slice edgewise into a rotor having knives revolved transversely to the slice which cut the slice into oblong pieces. Preferably the rotor is rotated on a horizontal axis and has radial pusher blades positioned behind the knives for pushing the potato pieces downwardly out of the rotor immediately after they are formed. The slicer also preferably includes a pusher revolved inside a guide member having a generally spiral portion leading to and spaced outwardly from a knife, and the pusher pushes a potato past the knife to form slices. The guide member preferably is flexible and adjustable means may be provided to move the guide member toward and away from the knife to adjust the thickness of the slices. Preferably the slices are corrugated and a plurality of lower strand-like belts extend from the guide member in positions spaced so as to enter the grooves in the slice. There preferably is provided a presser positioned above the lower belts and including a plurality of strand-like, elastic upper belts mounted under tension on a drive roll rotatable on a fixed axis and an idler roller carried by a frame so pivoted that the tension on the elastic upper belts pulls the idler roll toward the drive roll.

A complete understanding of the invention may be obtained from the following detailed description of a potato slicer forming a specific embodiment thereof, when read in conjunction with the appended drawings, in which:

FIG. 1 is a partially sectional front elevation view of a potato slicer forming one embodiment of the invention;

FIG. 2 is a partially sectional rear elevation view of the potato slicer of FIG. 1;

FIG. 3 is a horizontal section taken substantially along line 3—3 of FIG. 1;

FIG. 4 is a vertical section taken substantially along line 4—4 of FIG. 2;

FIG. 5 is an enlarged vertical section taken substantially along line 5—5 of FIG. 1;

FIG. 6 is an enlarged horizontal section taken substantially along line 6—6 of FIG. 1;

FIG. 7 is an enlarged vertical section taken substantially along line 7—7 of FIG. 1;

FIG. 8 is an enlarged vertical section taken substantially along line 8—8 of FIG. 3;

FIG. 9 is an enlarged inclined section taken substantially along line 9—9 of FIG. 1;

FIG. 10 is an enlarged section taken substantially along line 10—10 of FIG. 2;

FIG. 11 is an enlarged vertical section taken substantially along line 11—11 of FIG. 4; and FIG. 12 is a partially sectional, perspective view of a potato piece sliced by the slicer of FIG. 1.

Referring now in detail to the drawings, a potato slicer shown therein is adapted to slice a potato into generally oblong pieces 14 (FIG. 12) which may be varied in size from those adapted to form French fries to those adapted to form shoestrings. The slicer has a drum-like structure including a circular disc 16 (FIGS. 1–4) carrying near the periphery thereof a pusher plate 18 and rotated in a clockwise direction, as viewed in FIG. 1, so that the pusher plate pushes a potato 20 around a cylindrical portion 22 and an outwardly extending spiral portion 24 of a flexible guide plate or strip 26 to and past a known fixed knife 28. The knife is corrugated or undulating and slices a corrugated slice 30 having equally spaced lower grooves 32 and upper grooves 34 each parallel to and positioned midway between adjacent ones of the lower grooves.

Each slice is pushed onto a lower conveyor 40 (FIGS. 1 and 7) by its own momentum, and the lower conveyor and an upper, presser conveyor 42 push the slice into a chopper 43 having a rotor 44. Known corrugating knives 46 carried by the rotor slice the slice into the oblong pieces 14 (FIG. 12) as the slice is supported by a fixed anvil support 48 (FIG. 8) positioned close to the path of the knives 46. The pieces 14 are pushed downwardly out of the rotor into a chute 49 by radial plate 50 (FIG. 1) of the rotor positioned behind the knives 46. The slices 30 are advanced at a constant speed to the chopper by the conveyors 40 and 42 and an electric motor drive 52 (FIG. 3) rotates the rotor at a constant speed dependent on a rheostat control of the electric motor drive. The operator can vary the setting of the rheostat control as desired to adjust the speed of the rotor 44 thereby adjusting the width of the pieces 14 of potato which are chopped by the rotor. The thickness of the slices 30 can be adjusted by the operator by loosening wing nut 54 (FIGS. 1 and 3) on bolt 56 passing through bore 58 in enlarged end portion 60 of the guide plate 26 and slots 62 in frame plates 64 and 66, flexing the guide plate to bring the portion 24 thereof closer to or farther from the knife 28, as desired, and then retightening the wing nut 54.

The slicer disc 16 (FIG. 4) is secured by capscrews 70 to a hub 72 of a shaft 74 journaled in radial-and-thrust bearings 76, and fits into circular hole 78 in the frame plate 64. The bearings 76 are mounted in sleeve portions 80 and 82 of a spider 84 and a plate 86. Tie rods 88 and spacers 90 secure the plates 64 and 66 and the spider 84 rigidly together. The spider has spacer feet 91 at the end of each arm thereof. The frame plate 66 has a circular feed opening 92 therein through which potatoes are introduced, preferably one at a time.

An electric motor drive 100 (FIGS. 2 and 4) mounted on the frame plates 64 and 66 and having reduction gearing therein drives a pulley 102 to drive a pulley 104 through a belt 106. The pulley 104 is keyed to and drives the shaft 74 and the shaft 74 drives a pulley 108 keyed thereto to drive a belt 110, conveyor drive pulleys 112 and 114 and idler pulley 116. The idler pulley is rotatably mounted by a shaft 118 journaled in a bearing 120 carried by the plate 86, and the pulleys 112 and 114 are keyed to shafts 122 and 124 journaled in bearings 126 and 128 mounted on the plate 86. The shafts 122 and 124 are connected by flexible couplings 130 respectively to a shaft 132 of a drive conveyor roll 134 (FIG. 1) of the presser conveyor 42 and a shaft 136 of a drive conveyor roll 138 of the lower conveyor 40, the shafts 132 and 136 being parallel and journaled in bearings 140 (FIG. 3) of the frame plates 64 and 66.

The rolls 134 and 138 have laterally offset annular grooves 142 and 144 therein in which strand-like, elastic belts 146 and 148 fit. The upper belts 146 are so spaced laterally from each other as to lie in the upper grooves 34 in the potato slices 30 and the lower belts are positioned midway between the upper belts and fit into the lower grooves 32 in the slices of potatoes. Thus, the belts key the potato slices 30 to keep the grooves 32 and 34 parallel to the direction of feed of the conveyors 40 and 42.

The belts 148 are tensioned and course over idler roll 160 (FIGS. 1, 3 and 8) on a shaft 161 journaled in bearings in parallel, arm-like extensions 164 and 166 of the frame plates 64 and 66, respectively. The roll 160 has annular grooves 168 laterally aligned with the grooves 138 in the roll 136. The anvil support 48 is mounted on the ends of the arms 164 and 166.

The upper belts 146 (FIGS. 1, 7 and 8) press the slices 30 against the lower belts 148 and are mounted under tension on the roll 134 and a grooved idler roll 180. The roll 180 on a shaft 181 has annular grooves 182, and is mounted rotatably on a shaft 184 journaled in thrust bearings carried by the arms 186. The arms 186 are pivoted in slots 188 above the arms 164 and 166 of the plates 64 and 66. A pair of aligned, double-headed pins 190 fitting into arcuate notches 192 in the frame plates 64 and 66 and 194 in the arms 186 mount the arms 186 pivotally on a horizontal axis positioned above the plane defined by the axes of rotation of the rolls 134 and 180. Since the belts 146 are under tension between the rolls 134 and 180 and the pins 190 are above the centers of the rolls 134 and 180, the arms 186 are urged counterclockwise, as viewed in FIG. 1, to urge the roll 180 downwardly toward the roll 160 and urge the belts 146 into pressing engagement with the slice 30 of potato. The roll 134 is spaced upwardly from the lower conveyor 40 sufficiently to permit free entrance of the slices 30 of the maximum desired thickness, and the roll 180 is pivotal downwardly sufficiently that even the thinnest desired slice 30 is effectively engaged by the belts 146 and pressed against the belts 148. Knurled or ridged peripheral portions 196 and 198 of the rolls 160 and 180 extend beyond the belts 148 and 146 to dig into and hold the slice 30 during the chopping by the knives 46, and are of particular importance while the last piece 14 is cut from each slice 30

The pusher 18 is L-shaped and has a mounting base 210 mounted on the rotor disc 16 and a pusher plate portion 212 normal to the disc 16 and, as viewed in FIG. 1, extending inwardly relative to the disc 16 and somewhat forwardly relative to the direction of rotation of the disc, proceeding from the lower side edge of the arm 212 to the upper side edge thereof. This gives a slight wedging action to cause the arm to hold the potato 20 firmly against the guide plate 26 at all times. As best illustrated in FIGS. 1 and 4, the cylindrical portion 22 of the flexible strip 26 is held in an arcuate dado groove 220 in the plate 64 and an arcuate groove 222 in the plate 66 while the spiral portion 24 is freely movable between the plates 64 and 66 and is held at its ends by the bolt 58 and the adjacent end of the cylindrical portion 22. The arm 212 has a groove 227 therein forming a somewhat sharpened outer and forwardly projecting corner edge 229 adapted to bite somewhat into the potato when the potato is thin and almost completely sliced.

The knife 28 (FIGS. 1, 5, and 6) has a corrugated cutting edge portion 230 and a base portion 232 secured by screws 234 to a wedge-shaped mounting bar 236 fixed to the frame plates 64 and 66 by bolt 238. The adjacent end of the strip 26 fits into a notch 240 in the knife 28. The knife has a cylindrical upper surface 242 blending with the inner surface of the strip 26.

The feed of the slices 30 (FIG. 1) is substantially radial to the rotor 44, and the rotor includes discs 250 having a drum portion 252 to which the pushers 50 are secured. The discs are fixed and keyed to a shaft 254 (FIG. 3) journaled in bearings 256 fixed to side plates 258 and 260 bracketing and bolted rigidly to the frame plates 64 and 66. The motor drive 52 is mounted on the plate 66 and has a shaft 261 drivingly connected by a flexible coupling 262 to the shaft 254. A cover plate 264 covers the rotor. The knives 46 have cutting portions 270 (FIGS. 1 and 9) inclined at about 5° to the tangent of the rotor and fit into peripheral notches 272 in the discs 250. Screws 274 secure the knives 46 to the discs 250. The knives 46 have inwardly inclined trailing portions 277. Plates 284 (FIGS. 2 and 3) are secured by capscrews 286 to the plates 64 and 66 in positions retaining the arms 186 in the slots 188. A counterweight 288 (FIG. 4) is positioned on the disc 16 180° from the pusher 18.

The above-described slicer rapidly slices and chops potatoes, or other vegetables if so desired. The slicer is simple and rugged, is easily cleaned, and has low maintenance. It is easily adjustable to vary either or both the width and the thickness of the pieces.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:
1. In a vegetable slicer,
a fixed generally cylindrical guide member having an opening,
a slicing knife mounted in the opening,
rotor means,
and a pusher member mounted on the rotor means in a generally radial position relative to the rotor means and revolved thereby,
the pusher member having a forwardly projecting acute edge portion positioned at the outer extremity thereof for engaging a vegetable being sliced.
2. In combination,
corrugating slicer means for forming a corrugated slice of vegetable having parallel grooves on one face thereof,
conveyor means for advancing a slice formed by the slicer means along a predetermined path and having elongated splining means extending along said path and projecting into at least one of the grooves in the slice to maintain the slice in a position in which the grooves extend along said path, means for holding the slice against the conveyor means in a position in which the splining means projects into one of the grooves, and corrugating chopper means for cutting generally oblong pieces from the slice as it is advanced along said path.

3. In combination, slicer means for slicing a potato to form a corrugated slice and discharging the slice in a predetermined direction with grooves in the slice parallel to said direction, a plurality of endless, strand-like conveyor belts, means mounting the belts in parallel paths spaced apart to enter grooves in a corrugated slice formed by the slicer means and in positions receiving the slice from the slicer means as the slice is discharged therefrom, means for advancing the belts to advance the slice, and means for pressing the slice against the belts.

References Cited

UNITED STATES PATENTS

| | | | |
|---|---|---|---|
| 2,490,381 | 12/1949 | Shields | 198—165 X |
| 2,682,216 | 6/1954 | Shields | 198—165 X |
| 2,725,972 | 12/1955 | Howdle | 198—165 X |
| 2,857,042 | 10/1958 | Gaubert | 198—265 |
| 2,195,879 | 4/1940 | Urschel et al. | 146—165 |
| 2,465,670 | 3/1949 | Urschel et al. | 146—78 |
| 2,857,946 | 10/1958 | Nikkel | 146—107 |
| 2,991,814 | 7/1961 | Popeil | 146—169 |
| 3,228,274 | 1/1966 | Cagen | 83—355 X |

W. GRAYDON ABERCROMBIE, *Primary Examiner.*